United States Patent
Sze et al.

(10) Patent No.: US 10,036,630 B1
(45) Date of Patent: Jul. 31, 2018

(54) THREE-DIMENSIONAL IMAGING USING A MULTI-PHASE PROJECTOR

(71) Applicant: ASM Technology Singapore Pte Ltd, Singapore (SG)

(72) Inventors: Wui Fung Sze, Hong Kong (HK); Lei Song, Chengdu (CN); Jiangwen Deng, Hong Kong (HK)

(73) Assignee: ASM TECHNOLOGY SINGAPORE PTE LTD, Singapore (SG)

( * ) Notice: Subject to any disclaimer, the term of this patent is extended or adjusted under 35 U.S.C. 154(b) by 0 days.

(21) Appl. No.: 15/601,036

(22) Filed: May 22, 2017

(51) Int. Cl.
*G01J 4/00* (2006.01)
*G01B 11/25* (2006.01)
*G06T 7/55* (2017.01)

(52) U.S. Cl.
CPC ...... *G01B 11/2527* (2013.01); *G01B 11/2531* (2013.01); *G01B 11/2536* (2013.01); *G06T 7/55* (2017.01)

(58) Field of Classification Search
CPC ............ G01B 11/2527; G01B 11/2531; G01B 11/2536; G06T 7/55
USPC ........................................................ 356/364
See application file for complete search history.

(56) References Cited

U.S. PATENT DOCUMENTS

| | | | |
|---|---|---|---|
| 7,079,666 B2 | 7/2006 | Coulombe et al. | |
| 2010/0321773 A1* | 12/2010 | Chen | G02B 21/0032 359/386 |
| 2015/0070472 A1* | 3/2015 | Chen | G01B 11/2531 348/47 |
| 2016/0014315 A1 | 1/2016 | Deng et al. | |

* cited by examiner

*Primary Examiner* — Hina F Ayub
(74) *Attorney, Agent, or Firm* — Ostrolenk Faber LLP

(57) ABSTRACT

An apparatus for inspecting a surface of an object has a first light source operative to illuminate the object without producing a patterned image onto the object. A second light source projects a patterned image produced from a first polarized light from the second light source onto the object, wherein the first polarized light is polarized in a first polarization direction. A third light source projects the patterned image produced from a second polarized light from the third light source onto the object, wherein the second polarized light is polarized in a second polarization direction different from the first polarization direction. An imaging device views the surface of the object when the object is illuminated separately by the first, second and third light sources respectively for determining a profile of the surface of the object.

18 Claims, 4 Drawing Sheets

THREE-DIMENSIONAL IMAGING USING A MULTI-PHASE PROJECTOR

FIELD OF THE INVENTION

The invention relates to three-dimensional surface inspection and reconstruction, in particular for inspecting the surfaces of electronic devices.

BACKGROUND AND PRIOR ART

Pattern projection is commonly used in three-dimensional ("3D") surface reconstruction for various measurements and inspections of electronic devices in the semiconductor industry. This approach and technique traditionally requires at least 3 images that are in different phases to compute the depth or height information. Conventional approaches may produce images with different phases by using micro-display technology such as digital micro-mirror devices (DMD) or liquid crystal on silicon (LCOS) devices. They may also produce images by physically moving the gratings, or by changing the relative positions between a projector and an object being inspected.

For instance, US Patent Publication number 2016/0014315A1 entitled "Apparatus and Method for Reconstructing a Three-Dimensional Profile of a Target Surface" describes an apparatus for reconstructing a 3D profile of a target surface of an object. The apparatus generates two images, one of which produces a pattern onto the target surface using a grating or reticle. One light path passes directly through or is reflected from the grating, and the other light path illuminates every part of the target surface as its light path does not include such a grating or reticle. With this design, a tilting of the grating can be controlled so that a focal plane of the illumination can be aligned with the object being inspected.

However, the system is only able to generate two sets of images. Moreover, assumptions regarding the fringe modulation or surface flatness are required in order to retrieve information relating to heights of points on the target surface that is measured. As there are instances where the fringe modulation on the target surface may change from point to point, such as where the object comprises different materials, the accuracy of the reconstruction will be adversely affected. On the other hand, if the measurable surface is constrained in relation to surface flatness, then the profiles of small height variations on the target surface cannot be reconstructed.

In another example, U.S. Pat. No. 7,079,666 entitled "System for Simultaneous Projections of Multiple Phase-Shifted Patterns for the Three-Dimensional Inspection of an Object" describes a 3D image grabber that allows for the simultaneous projection of multiple phase-shifted patterns onto an object, and the simultaneous acquisition of multiple images of these phase-shifted patterns. The image acquisition assembly is sensitive to different monochromatic lights for gathering incoming images illuminated by the plurality of phase-shifted patterns simultaneously. Different color patterns are thus simultaneously projected onto the object, and different colors are acquired as different images by the image acquisition assembly. Such phase-shifted pattern may be produced by a spectral splitter.

A shortcoming with generating different phase-shifted patterns having different lighting colors is that when an object being inspected has an uneven color spectrum distribution, the reflectivity intensities from the object would vary with the different lighting colors. In other words, the imaged intensities would be inconsistent across images that are illuminated with the different phases of light. This would inherently yield inaccurate height findings for objects with uneven color spectrum distributions.

SUMMARY OF THE INVENTION

It is thus an object of the invention to seek to provide an apparatus for 3D inspection that overcomes some of the aforesaid shortcomings, and is capable of providing an apparatus that is more reliable than the conventional approaches.

According to a first aspect of the invention, the invention provides an apparatus for inspecting a surface of an object, comprising: a first light source operative to illuminate the object without producing a patterned image onto the object; a second light source operative to project a patterned image produced from a first polarized light from the second light source onto the object, the first polarized light being polarized in a first polarization direction; a third light source operative to project the patterned image produced from a second polarized light from the third light source onto the object, the second polarized light being polarized in a second polarization direction which is different from the first polarization direction; and an imaging device operative to capture images of the surface of the object when the object is illuminated separately by the first, second and third light sources respectively for determining a profile of the surface of the object.

According to a second aspect of the invention, the invention provides a method for inspecting a surface of an object, comprising the steps of: illuminating the object with a first light source without producing a patterned image onto the object; projecting a patterned image produced by a first polarized light from a second light source which is polarized in a first polarization direction onto the object; projecting the patterned image produced by a second polarized light from a third light source which is polarized in a second polarization direction onto the object, the second polarization direction being different from the first polarization direction; and capturing images of the surface of the object when the object is illuminated separately by the first, second and third light sources respectively with an imaging device to determine a profile of the surface of the object.

It would be convenient hereinafter to describe the invention in greater detail by reference to the accompanying drawings which illustrate specific preferred embodiments of the invention. The particularity of the drawings and the related description is not to be understood as superseding the generality of the broad identification of the invention as defined by the claims.

BRIEF DESCRIPTION OF THE DRAWINGS

An example of an inspection apparatus in accordance with the invention will now be described with reference to the accompanying drawings, in which.

DETAILED DESCRIPTION OF THE PREFERRED EMBODIMENT OF THE INVENTION

Figure 1:
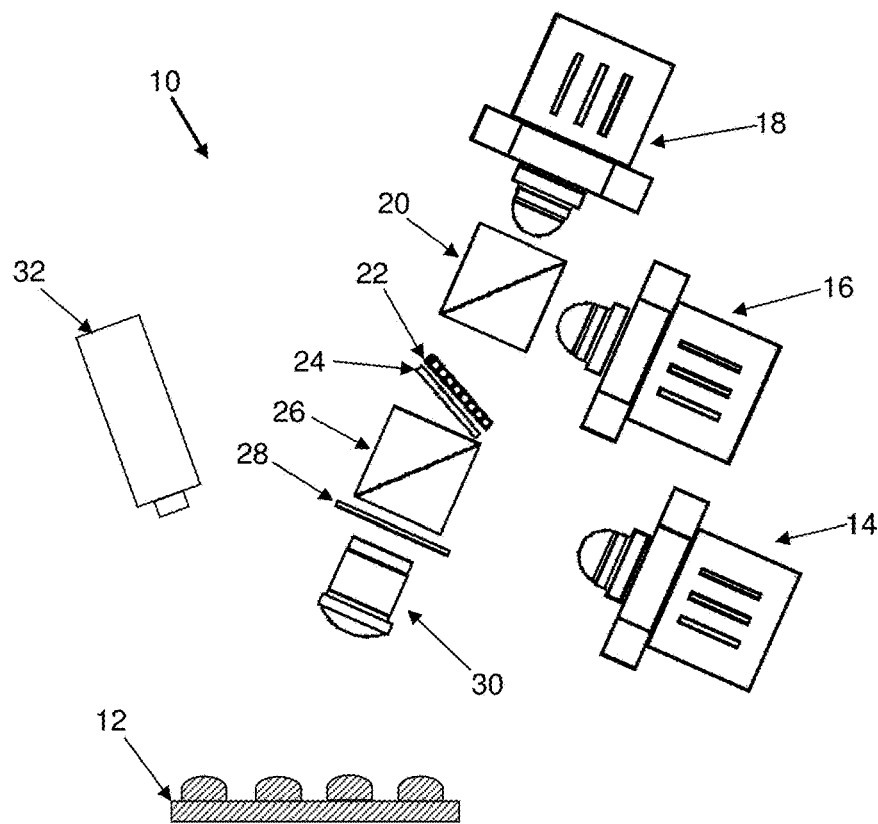
FIG. 1 is a schematic view of an inspection apparatus for projecting multiple patterns onto a surface of an object according to a first preferred embodiment of the invention.

FIG. 1 is a schematic view of an inspection apparatus 10 for projecting multiple patterns onto a surface of an object 12 for inspecting the surface of the object 12 according to a first preferred embodiment of the invention. The inspection apparatus 10 comprises a first light source 14, a second light source 16 and a third light source 18. A polarization beam splitter 20, which may also be in the form of a polarization prism, is positioned to receive light rays from the second and third light sources 16, 18.

Light rays from the second and third light sources 16, 18 are passed through a grating 22, and a birefringence plate 24 positioned after the grating 22 such that the birefringence plate 24 is located between the object 12 and the grating 22. The grating 22 may comprise a sinusoidal pattern to form a fringe pattern onto the surface of the object 12. A second beam splitter 26 (which may also be in the form of a prism) is positioned to receive light rays that are passed through the grating 22 and birefringence plate 24, and also light rays directly received from the first light source 14. The birefringence plate 24 may comprise, for instance, calcite and Lithium Niobate crystal. Other materials with birefringence properties as known in the art may also be used. Light rays that are transmitted from the second beam splitter 26 are passed through a quarter-wave plate 28 and are then imaged by imaging lenses 30 onto the surface of the object 12. An imaging device 32, such as a CCD camera, is used to capture images of the surface of the object 12 when it is illuminated by the first, second and third light sources 14, 16, 18 respectively. Based on the captured images, a profile of the surface of the object 12 may be determined as described in further detail below.

Figure 2:
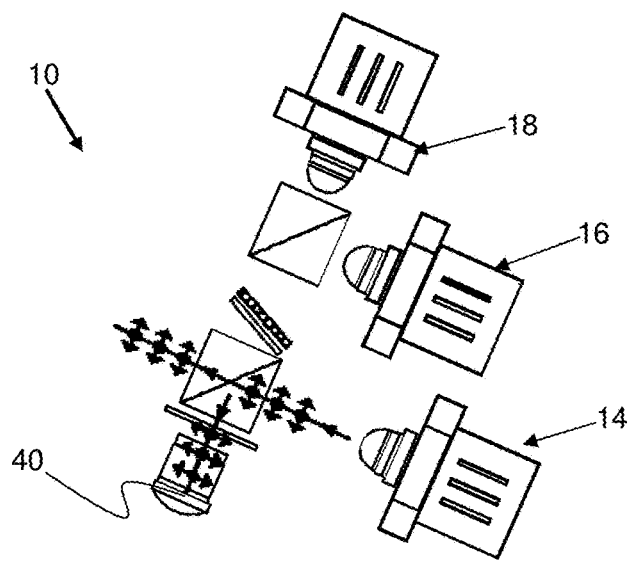
FIG. 2 is a schematic view of the inspection apparatus of FIG. 1 illustrating a first light path in respect of a first light source of the inspection apparatus.

FIG. 2 is a schematic view of the inspection apparatus 10 of FIG. 1 illustrating a first light path 40 in respect of the first light source 14 of the inspection apparatus 10. Light from the first light source 14 does not pass through the grating 22 and is unpolarized throughout the first light path 40. It serves as a direct illumination of the surface of the object 12 without the projection of a fringe pattern and without producing a patterned image onto the object.

Figure 3:
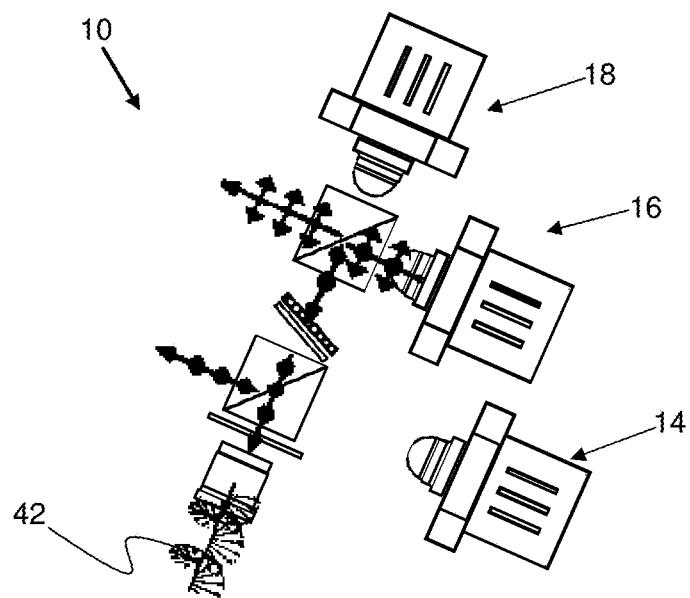
FIG. 3 is a schematic view of the inspection apparatus of FIG. 1 illustrating a second light path in respect of a second light source of the inspection apparatus.

FIG. 3 is a schematic view of the inspection apparatus 10 of FIG. 1 illustrating a second light path 42 in respect of the second light source 16 of the inspection apparatus 10. Light rays from the second light source 16 are reflected by the polarization beam splitter 20 to yield a first polarized light, which is polarized in a first polarization direction. The first polarized light may be in the form of s-waves (which are polarized transversely to the direction of propagation of the light rays). The s-waves are passed through the grating 22 and also the birefringence plate 24. Thus, an image of the grating 22 is produced and is projected onto the surface of the object 12 by the imaging lenses 30. In particular, the quarter-wave plate 28 is operative to change linear polarization of the s-waves to circular polarization so as to emulate unpolarized lighting. This is useful when the surface of the object 12 includes materials that have inherent polarization properties.

Figure 4:
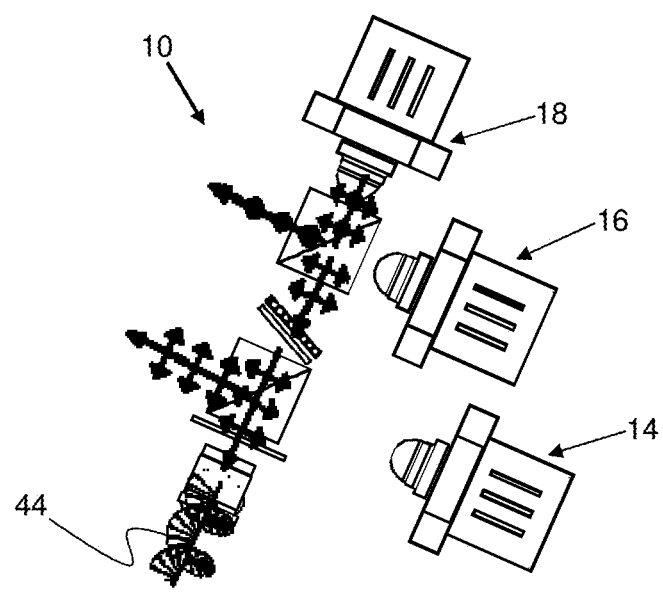
FIG. 4 is a schematic view of the inspection apparatus of FIG. 1 illustrating a third light path in respect of a third light source of the inspection apparatus.

FIG. 4 is a schematic view of the inspection apparatus 10 of FIG. 1 illustrating a third light path 44 in respect of the third light source 18 of the inspection apparatus 10. The third light source 18 is mostly similar to the second light source 16, except that a second polarized light, which is polarized in a second polarization direction, is generated. The second polarized light may be in the form of p-waves (which are polarized longitudinally with respect to the direction of the light rays), which are generated before the grating 22 after light rays from the third light source 18 pass through the polarization beam splitter 20. Thus, the second polarization direction is different from the first polarization direction, and more preferably, the first polarization direction is transverse to the second polarization direction. The third light source 18 also produces waves with a circular polarization after the light rays are passed through the quarter-wave plate 28, but the quarter-wave plate 28 is operative to circularly polarize these light rays in a reverse direction to that from the second light source 16 onto the object 12.

Since an optical property of birefringence materials such as calcite and Lithium Niobate crystal is that their refractive indexes depend on the polarization and propagation directions of light that are passed through them, the projected images on the surface of the object 12 would exhibit different extents of shift when under illumination by the second light source 16 and the third light source 18 respectively. The extent of displacement of the shifts is governed primarily by the reflective index of the constituent material, tilting angle and thickness of the birefringence plate 24. Hence, the extent of shift of the fringe pattern from the grating 22 when the surface of the object 12 is illuminated by the second and third light sources 16, 18 respectively can be estimated in advance by design.

Although one grating 22 and one birefringence plate 24 are shared by the second and third light sources 16, 18 in the above embodiment, it should be appreciated that it is also possible for the inspection apparatus 10 to be set up such that a separate grating 22 and birefringence plate 24 is used for each respective light source 16, 18.

Figure 5A:
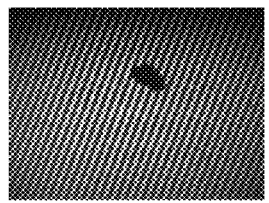
FIGS. 5A to 5D illustrate different refraction effects from different polarization light sources when their light rays are passed through a birefringence plate.

FIGS. 5A to 5D illustrate different refraction effects from different polarization light sources 16, 18 when their light rays are passed through a birefringence plate 24. FIG. 5A shows a reference image where a pattern is projected directly without passing the light rays through a birefringence plate 24.

Figure 5B:
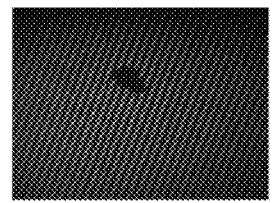
Figure 5C:
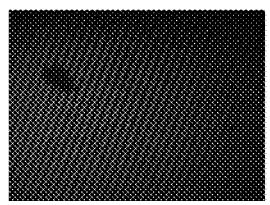
Figure 5D:
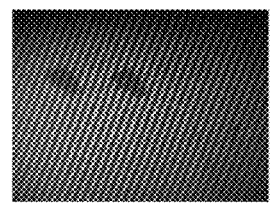

In FIG. 5B, the same pattern is being illuminated by s-waves that have been passed through a birefringence plate 24. It can be seen that the projected pattern has shifted to the left. In FIG. 5C, the pattern is being illuminated by p-waves that have been passed through the same birefringence plate 24. It can be seen that the projected pattern has an even larger shift to the left as compared with when it was illuminated by s-waves in FIG. 5B. FIG. 5D shows the same pattern being illuminated by both s-waves and p-waves having passed through the birefringence plate 24, with the results from FIG. 5B and FIG. 5C being superimposed on each other for comparison.

Figure 6A:
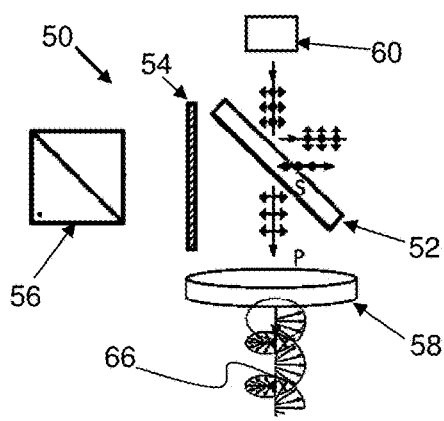
FIGS. 6A to 6C illustrate light paths and their corresponding polarizations generated by another configuration of an inspection apparatus according to a second preferred embodiment of the invention.
Figure 6B:
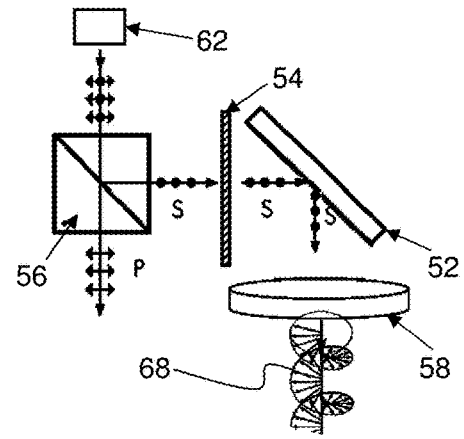
Figure 6C:
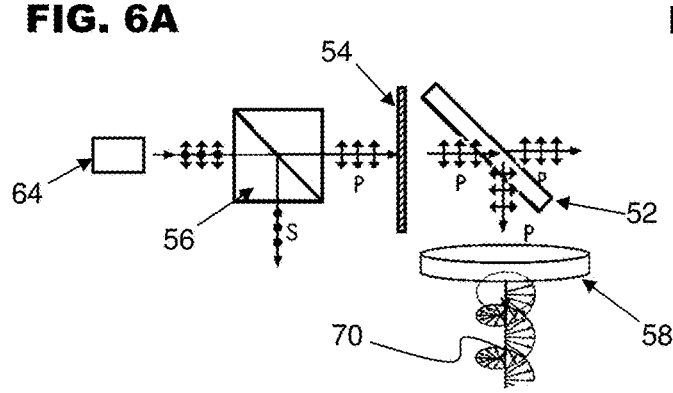

FIGS. 6A to 6C illustrate light paths and their corresponding polarizations generated by another configuration of the inspection apparatus 50 according to a second preferred embodiment of the invention. In this embodiment, a specially-coated beam splitter plate 52 is used instead of a birefringence plate.

A first side of the beam splitter plate 52 which is nearest to a polarized light source is coated to cause polarization, while a second side of the beam splitter plate 52 opposite to the first side thereof is coated to be reflective.

In the aforesaid setup illustrated in FIG. 6A, a first light source 60 is designed to yield p-waves as its light rays are passed through the beam splitter plate 52. Since the first light path 66 from the first light source 60 does not pass through a grating 54, no image of a fringe pattern is formed on the surface of the object 12.

In FIG. 6B, light rays from a second light source 62 are reflected by a polarization cube 56 to generate s-waves that are directed along a second light path 68. After the light rays pass through the grating 54, an image of the grating is reflected by the second side of the beam splitter plate 52 after being refracted by the first side thereof, and is formed on the surface of the object 12.

In FIG. 6C, p-waves are created from light rays generated by a third light source 64 by transmitting the light rays through the polarization cube 56 so that an image of the grating 54 is reflected by the second side of the beam splitter plate 52 along a third light path 70. Thus, different displacements of the projected patterned image from the grating 54 result from controlling the thickness of the coated beam splitter plate 52 between its first and second sides. As compared to the first preferred embodiment of the invention, since the optical distances from the grating 54 to the object 12 would be different under the illuminations of the second and third light sources 62, 64 respectively, the numerical aperture of the imaging device (not shown) would have to be small enough such that its optical depth of field is sufficient to cover the focus levels for both the second and third light paths 68, 70.

After obtaining three images from the three respective lighting paths in the first and second embodiments of the invention, height information regarding the surface of the object 12 can be computed as follows:

A point x on the three obtained images can be mathematically expressed as:

$$I_1 = r \cdot L_1$$

$$I_2 = r \cdot L_2 \cdot (1 + m \cdot \cos \theta)$$

$$I_3 = r \cdot L_3 \cdot (1 + m \cdot \cos(\theta + \Delta \phi)) \quad (1)$$

where,
  r connotes a reflectivity of the surface of the object,
  $L_i$ is a factor relating to the lighting strength of each light source,
  m models a fringe amplitude associated with material properties and the focus between object, projection and imaging optics,
  θ is the phase value, and
  Δϕ is the phase offset between the second and third light sources.

The lighting strengths of the projectors (i.e. $L_1$, $L_2$ and $L_3$) are related to the lighting strengths of the light sources and can be calibrated in advance. Hence, equation (1) may be simplified as:

$$I_1 = r$$

$$I_2 = r \cdot (1 + m \cdot \cos \theta)$$

$$I_3 = r \cdot (1 + m \cdot \cos(\theta + \Delta \phi))$$

$$= r \cdot (1 + m \cdot (\cos \theta \cdot \cos \Delta \phi - \sin \theta \cdot \sin \Delta \phi))$$

The above can be expressed as:

$$R = (I_2 - I_1)/I_1 = m \cdot \cos \theta$$

$$R' = (I_3 - I_1)/I_1 = m \cdot (\cos \theta \cdot \cos \Delta \phi - \sin \theta \cdot \sin \Delta \phi),$$

which gives:

$$m \cdot \cos \theta = R$$

$$m \cdot \sin \theta = R/\tan \Delta \phi - R'/\sin \Delta \phi \quad (2)$$

The phase value θ (and hence the height h) can be retrieved from the equation: $\theta = \phi_0 + \omega_h \cdot h$, where $\phi_0$ is a reference phase with respect to a calibration zero, and $\omega_h$ is an angular frequency of the pattern along a vertical direction. Since the phase shift Δϕ is pre-determined by the design of the inspection apparatus 10, 50, the exact value can be either estimated or calibrated precisely by computing the displacement between two imaged patterns on a flat plane under illumination from the second and third light sources 62, 64 respectively.

Figure 7A:
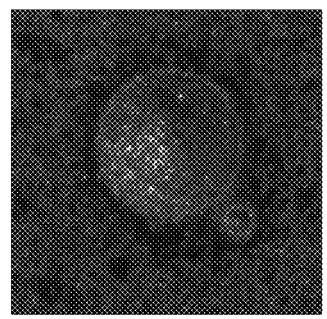
FIGS. 7A to 7C are exemplary images produced by the inspection apparatus according to the preferred embodiments of the invention.
Figure 7B:
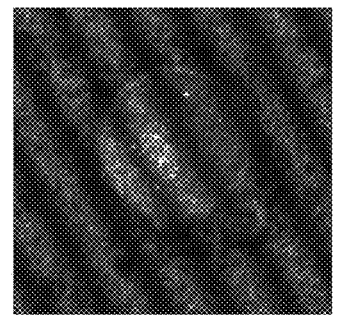
Figure 7C:
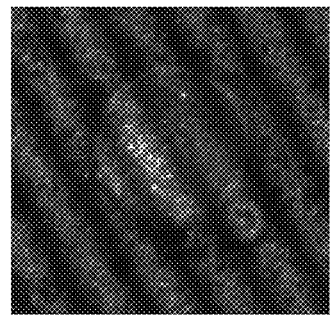

FIGS. 7A to 7C are exemplary images produced by the inspection apparatus 10, 50 according to the preferred embodiments of the invention. Fringe patterns have been projected onto an object comprising a drop of epoxy on a lead frame substrate.

FIG. 7A is an image illuminated by light rays from the first light source 14, 60 that do not pass through a patterned grating 22, 54. FIG. 7B is an image illuminated by light rays from the second light source 16, 62 that have been passed through the patterned grating 22, 54, and includes a fringe pattern. FIG. 7C is an image illuminated by light rays from the third light source 18, 64 that have been passed through the patterned grating 22, 54 but at a different phase such that the fringe pattern has been shifted as compared with the image in FIG. 7B.

Figure 8A:
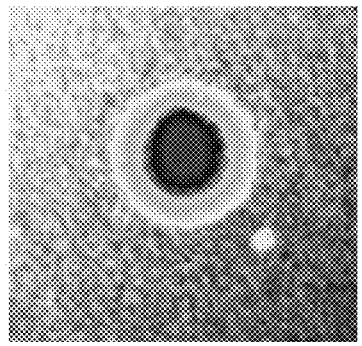
FIGS. 8A and 8B illustrate a reconstructed 3D profile from the images obtained from FIGS. 7A to 7C.
Figure 8B:
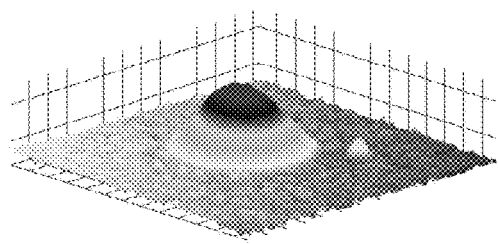

FIGS. 8A and 8B illustrate a reconstructed 3D profile from the images obtained from FIGS. 7A to 7C. FIG. 8A is a plan view of the object 12, whereas FIG. 8B is an isometric view which includes its height profile.

It should be appreciated that the preferred embodiments of the invention describe an approach to generate three sets of images, in which one image is merely an illumination of the surface of the object 10 and the other two images comprise structured lighting with different extents of shift. The said shift of the projected pattern is realizable by, for example, switching light sources so that they have two different polarization directions. Such shift can result, for instance, from passing the light rays through a birefringence plate 24, or a beam splitter plate 52 which has been coated differently on its two opposing sides.

The linearly polarized light rays are then converted to circularly polarized light rays, so that the inspection apparatus 10, 50 is also applicable to materials that have polarization properties. In the inspection apparatus 10, 50, all fringe images result from a single grating, and need not involve any mechanical motion within the inspection apparatus 10, 50.

A benefit of the aforesaid approach is that it is more accurate than methods which produce only two patterns for inspection a surface. The grating 22, 54 that is used is also adjustable to be aligned with a plane of a surface. A further benefit is that the inspection apparatus 10, 50 can have a simple structure and be small in size, hence lowering the manufacturing cost. A side light image may be directly produced without any calculation. Moreover, the inspection apparatus would be able to handle materials with inherent polarization properties, since the linear polarizations from the lighting sources are converted to circular polarizations prior to projecting the patterns onto the surface of the object 12.

The invention described herein is susceptible to variations, modifications and/or additions other than those specifically described and it is to be understood that the invention includes all such variations, modifications and/or additions which fall within the spirit and scope of the above description.

The invention claimed is:

1. Apparatus for inspecting a surface of an object, comprising:
    a first light source operative to illuminate the object without producing a patterned image onto the object;
    a second light source operative to project a patterned image produced from a first polarized light from the second light source onto the object, the first polarized light being polarized in a first polarization direction;
    a third light source operative to project the patterned image produced from a second polarized light from the third light source onto the object, the second polarized light being polarized in a second polarization direction which is different from the first polarization direction; and
    an imaging device operative to capture images of the surface of the object when the object is illuminated separately by the first, second and third light sources respectively for determining a profile of the surface of the object.

2. Apparatus as claimed in claim 1, further comprising a polarization beam splitter configured to polarize light rays from the second light source in the first polarization direction.

3. Apparatus as claimed in claim 2, wherein the polarization beam splitter is configured to polarize light rays from the third light source in the second polarization direction.

4. Apparatus as claimed in claim 2, wherein the polarization beam splitter comprises a polarization cube or prism.

5. Apparatus as claimed in claim 1, further comprising at least one grating through which light rays from the second and third light sources are passed for producing the patterned image.

6. Apparatus as claimed in claim 5, further comprising at least one birefringence plate through which polarized light rays from the second and third light sources are passed.

7. Apparatus as claimed in claim 5, wherein the at least one birefringence plate is positioned between the at least one grating and the object.

8. Apparatus as claimed in claim 5, wherein the birefringence plate is operative to generate a different extent of shift in differently polarized light that is passed through it.

9. Apparatus as claimed in claim 5, wherein the birefringence plate comprises a Lithium Niobate crystal.

10. Apparatus as claimed in claim 1, wherein the first polarization direction is transverse to the second polarization direction.

11. Apparatus as claimed in claim 10, wherein the first polarized light and the second polarized light comprise s-waves or p-waves.

12. Apparatus as claimed in claim 1, further comprising a quarter-wave plate positioned over the object for changing linearly polarized light to circularly polarized light to be projected onto the object.

13. Apparatus as claimed in claim 12, wherein the quarter-wave plate is configured to produce circularly polarized light in respect of the second polarized light which is in a reverse direction to circularly polarized light in respect of the first polarized light.

14. Apparatus as claimed in claim 1, wherein the apparatus is configured such that the patterned image from the second polarized light exhibits a different extent of shift on the object as compared to the patterned image generated from the first polarized light.

15. Apparatus as claimed in claim 1, further comprising a beam splitter plate positioned to polarize light rays from the second and third light sources in different directions, a first side of the beam splitter plate being coated to cause polarization of light rays from the second and third light sources.

16. Apparatus as claimed in claim 15, wherein a second side of the beam splitter plate opposite to the first side is coated to reflect light rays from the second and third light sources.

17. Apparatus as claimed in claim 16, wherein a thickness of the beam splitter plate causes a shift in the patterned image from the second polarized light as compared to the patterned image generated from the first polarized light.

18. Method for inspecting a surface of an object, comprising the steps of:
    illuminating the object with a first light source without producing a patterned image onto the object;
    projecting a patterned image produced by a first polarized light from a second light source which is polarized in a first polarization direction onto the object;
    projecting the patterned image produced by a second polarized light from a third light source which is polarized in a second polarization direction onto the object, the second polarization direction being different from the first polarization direction; and
    capturing images of the surface of the object when the object is illuminated separately by the first, second and third light sources respectively with an imaging device to determine a profile of the surface of the object.

\* \* \* \* \*